(12) United States Patent
Dwyer, III

(10) Patent No.: US 6,430,682 B1
(45) Date of Patent: Aug. 6, 2002

(54) RELIABLE BRANCH PREDICTIONS FOR REAL-TIME APPLICATIONS

(75) Inventor: Harry Dwyer, III, Annadale, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/151,981

(22) Filed: Sep. 11, 1998

(51) Int. Cl.$^7$ ................................................ G06F 9/32
(52) U.S. Cl. ........................ 712/234; 712/233; 712/235
(58) Field of Search .................. 712/23, 206, 234–240

(56) References Cited

U.S. PATENT DOCUMENTS

| | | | | |
|---|---|---|---|---|
| 4,991,080 A | * | 2/1991 | Emma et al. ................ | 712/206 |
| 5,210,831 A | * | 5/1993 | Emma et al. ................ | 712/240 |
| 5,247,627 A | * | 9/1993 | Murakami et al. .......... | 712/236 |
| 5,371,862 A | * | 12/1994 | Suzuki et al. ............... | 712/234 |
| 5,408,620 A | * | 4/1995 | Asakawa et al. ............ | 712/234 |
| 5,418,917 A | * | 5/1995 | Hiraoka et al. ............. | 712/234 |
| 5,664,135 A | * | 9/1997 | Schlansker et al. ......... | 712/201 |
| 5,748,936 A | | 5/1998 | Karp et al. .................. | 395/394 |
| 5,815,695 A | * | 9/1998 | James et al. ................ | 712/200 |
| 5,907,714 A | * | 5/1999 | Doutaud et al. ............. | 712/23 |
| 5,949,995 A | * | 9/1999 | Freeman et al. ............ | 712/239 |

OTHER PUBLICATIONS

Tom R. Halfhill, "Beyond Pentium II", BYTE, pp. 80–83, 86, Dec., 1997.

* cited by examiner

Primary Examiner—Zarni Maung
Assistant Examiner—Wen-Tai Lin
(74) Attorney, Agent, or Firm—Gibbons, Del Deo Dolan, Griffinger & Vecchione

(57) ABSTRACT

Reliable branch predictions for real-time applications reduce both conditional branch execution time and uncertainties associated with their prediction in a computer implemented application. One method ensures that certain conditional branches are always correctly predicted, effectively converting them to jump instructions during program execution. Another method exploits the fact that some conditional branches always branch in the same direction within a task invocation, although that direction may vary across invocations. These methods improve computer processor utilization and performance.

8 Claims, 5 Drawing Sheets

RELIABLE BRANCH PREDICTIONS FOR REAL-TIME APPLICATIONS

FIELD OF THE INVENTION

This invention relates to computer systems, and more particularly to branch prediction in instruction processing.

BACKGROUND OF THE INVENTION

In computer design, engineers are constantly looking for new approaches to increase the effective rate at which the processor unit executes instructions. One method of increasing the effective rate of processor execution is by prefetching. Prefetching can be used to bring in information from the memory into an instruction cache before the processor needs the information.

Primarily, there are two different types of prefetching, instruction prefetching and data prefetching. Prefetching instruction lines from memory to cache reduces the number of instruction cache misses. Data prefetching reduces data cache misses by exploiting the program access pattern for data.

There has been considerable research done in the area of data-prefetching, in part because this kind of prefetching is in high demand and usually fairly simple to implement. However, the idea of prefetching instructions has not been as extensively researched, due to its complexity. With the advent of superscalar machines, this type of prefetching is needed.

In designing a processor which utilizes prefetching, the designer has to take into consideration several issues. It is possible for data or instructions to be prefetched into the cache that will never be used by the processor. If the processor accesses memory in a sequential manner, this problem will not occur. However, if branches, jumps, and function calls are taken into consideration, prefetched data/instructions may not be used if the program execution path is different from the instruction prefetch path. If the data is prefetched too early, it can become stale before it is referenced, requiring refetching of the data, thus, increasing memory traffic.

In next line prefetching, the cache line that is next to the current cache line is prefetched automatically if it is not already in the cache. This method is simple to implement, in that a lot of additional logic is not required. Performance is fairly good if branches frequently execute the fallthrough path. However, this method is not very useful in the case where a branch is taken. In unconditional jumps and procedure calls, next line prefetching causes an increase in memory traffic and is not likely to prefetch the cache lines that are going to be used. However, because of the ease of implementation and small cost, the next line prefetching scheme can be found in many microprocessors.

SUMMARY OF THE INVENTION

The invention provides branch execution mechanisms that efficiently manage processing and hardware resources for computer processing. The invention presents methods that increase processor performance and improve the worst-case time bounds of tasks on computer processors with branch execution.

In one embodiment, a branch execution method is disclosed for reducing the execution time of certain conditional branches effectively converting them into jump instructions. A conditional branch instruction suitable for this embodiment is divided into conditional-test and execute-branch steps in which the conditional branch instruction is pre-conditioned to take or not-take the branch according to the results of the conditional test step.

Advantageously, the branch execution method minimizes overhead through the use of a one bit entry for each conditional branch instruction wherein entries are indexed by the addresses of active pre-conditioned branch instructions.

In an another embodiment, the branch execution minimizes overhead through the use of a one bit entry for each conditional branch instruction wherein entries are a fixed part of the architecture and are indexed by the location of each entry in a register.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1A:
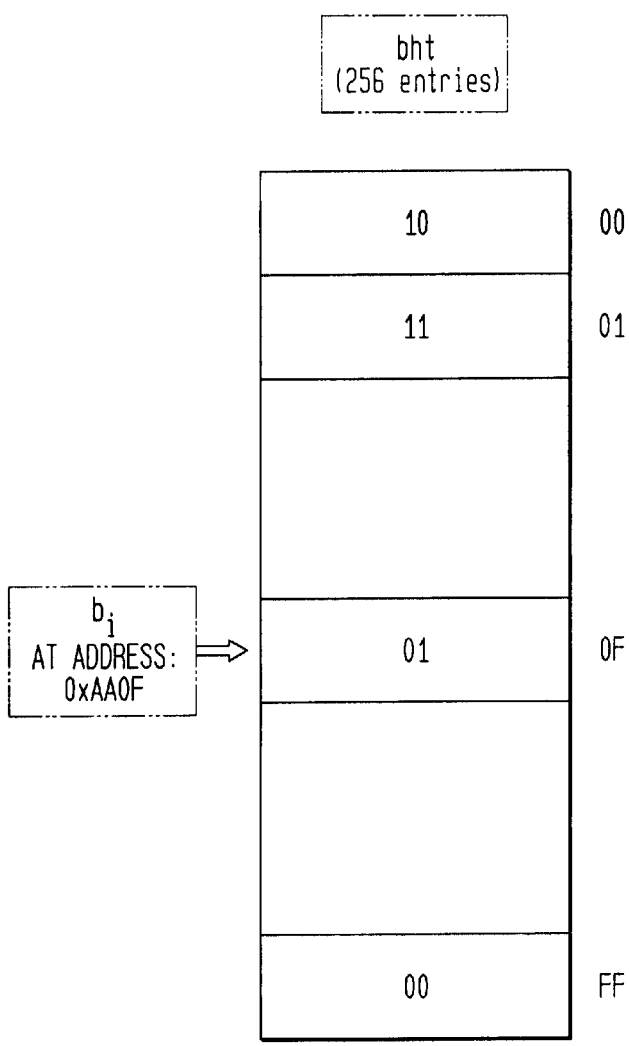
FIGS. 1a and 1b show a branch history table.

New approaches to increase the effective rate at which the processor unit executes instructions are necessary to meet increasing computer system demands. One method of increasing the effective rate of processor execution is by prefetching. Prefetching can be used to bring in information from the memory into an instruction cache before the processor needs the information. Instruction branches present a need for reliable branch predictions so that the computer system does not stop prefetching instructions or prefetch instructions from a branch not taken.

To meet the increasing performance demands of realtime applications, some specialized processors incorporate techniques previously found only in more complex, general-purpose processors. Superscalar, LIW (Long Instruction Word) and VLIW (Very Long Instruction Word) techniques are examples. Some techniques that are effective in general-purpose processors are not adopted by processors that execute real-time tasks because they cause execution-time analysis to be difficult or impossible.

A critical parameter of a real-time task is the maximum response time over all possible inputs. In some systems, a task scheduler allocates a processor's cycles among multiple tasks to meet their response time requirements. Thus, the worst-case execution time of each task must be known. When instruction timings or execution paths are uncertain, they are estimated conservatively. To the extent that estimated worst-case time-bounds exceed the actual worst case execution times for a task, such a task is allocated more execution time than it can possibly use, in turn wasting system capability and performance.

A conditional branch may have an uncertain execution time. A conditional branch directs program flow to alternative paths based on a test of a condition it embodies. If the condition is met, the branch is taken, and the target instruction stream is fetched. Often, little or no processing work is done while the target instruction stream is fetched, which may take several cycles. An exception is a processor that has "delayed branches", where a conditional branch is followed by a number of instruction slots. An attempt (often unsuccessful) is made to fill these slots with useful instructions that complete before the branch target instruction executes. If no instructions are found for these slots, NOPs ("do nothing") instructions are inserted in those slots.

A long branch delay is a well-known problem in today's high performance superscalar and superpipeline processor designs. A common technique used to alleviate this problem is to predict the direction of branches during the instruction fetch. Predicting the outcomes of conditional branches usually enhances processor performance. When possible, instructions on a predicted path are fetched before a branch's selection has been determined (resolved), to execute immediately after branch resolution, or, in some advanced processors, to execute speculatively prior to its resolution. When a misprediction occurs, instructions on a wrong path are discarded and the correct instruction stream is then fetched.

While branch prediction is often effective in general purpose processors, its use in real-time systems is problematic because it causes execution time to be uncertain, making a tight worst-case time-bound difficult to achieve. Certainly, an execution time may be bounded on a processor with branch prediction by assuming that every conditional branch is mispredicted, but this leads to gross inefficiency.

Before describing particulars of the method of the invention, it is useful to briefly consider some of the characteristics of branch prediction generally. Initially it is noted that a predicated instruction affects program state only if its associated condition (predicate) tests true. A conditional branch with condition p may be eliminated by predicating instructions on its taken and not-taken paths with p and ¬p respectively and assembling them into a single instruction stream. Since instructions on both branch paths are processed, relatively short paths and an ability to perform concurrent executions are desirable. If an instruction's execution time is unaffected by its predicate's value, the resulting instruction stream executes in constant time (excepting memory accesses), facilitating analysis.

A traditional conditional branch is shown written in pseudo code in Table 1 below:

TABLE 1

| IF p THEN GO TO NEXT1 OTHERWISE | |
|---|---|
| | INSTRUCTION 1 |
| | INSTRUCTION 2 |
| | GO TO NEXT2 |
| NEXT1: | INSTRUCTION3 |
| | INSTRUCTION4 |
| NEXT2: | INSTRUCTION5 |

An example of eliminating the conditional branches using predicated instructions is shown in Table 2 below:

TABLE 2

| IF ¬p THEN INSTRUCTION 1 |
|---|
| IF ¬p THEN INSTRUCTION 2 |
| IF p THEN INSTRUCTION3 |
| IF p THEN INSTRUCTION4 |
| INSTRUCTION5 |

Branch prediction works because a branch has a tendency to resolve as it has recently and as it has in similar circumstances. Simple, yet effective, mechanisms base a prediction on a branch's recent behavior. One such mechanism uses a 2-bit counter. A processor maintains a table of 2-bit entries, called a Branch History Table (bht), that is accessed with a branch instruction's address. The value in an entry is a result of a branch's recent behavior and predicts its next resolution. An entry's value is incremented when a branch mapped to it is taken and is decremented when the branch mapped to it is not-taken. In the bht values saturate at the levels of 11 and 00, i.e., 11 incremented remains 11 and 00 decremented remains 00. Values specify predictions: 11 or 10 is "taken," and 01 or 00 is "not-taken." The value 11 corresponds to the highest probability prediction that the branch is "taken" and the value 00 corresponds to the lowest probability that the branch is "taken".

Figure 1B:
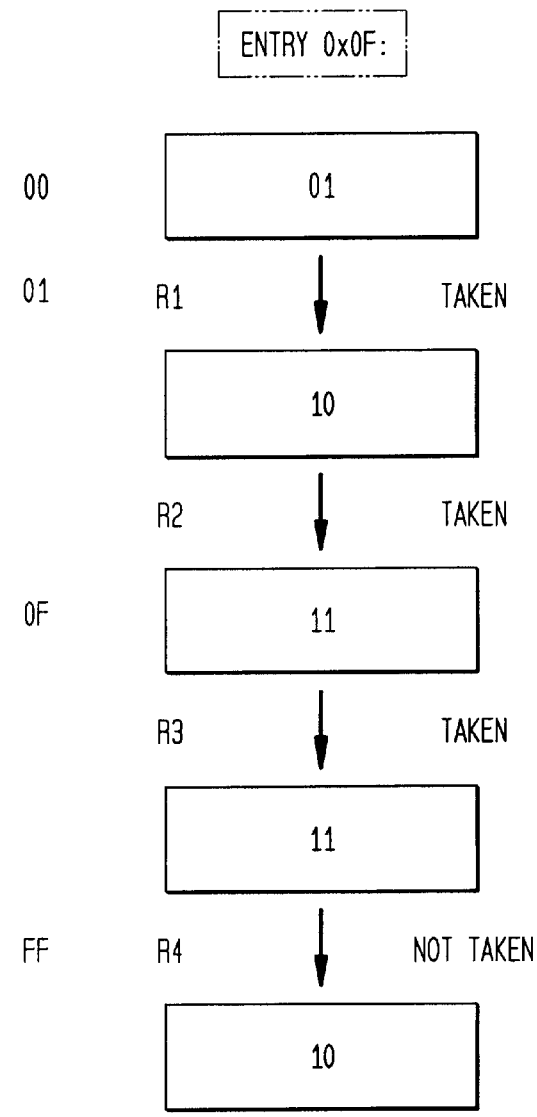

Referring to FIGS. 1a and 1b, there is shown a bht with 256 entries. It is indexed by the low-order 8 bits of a branch instruction's address. For example, branch $b_i$, located at address 0xAA0F, indexes entry 0x0F (01) in FIG. 1a. The value 01 in entry 0x0F is shown updated in FIG. 1b after each of four subsequent $b_i$ resolutions, R1, R2, R3, and R4.

In practice, tables have limited size, so multiple branches may address a single table entry. A branch at address 0xCC0F also accesses the bht entry at 0x0F. Aliasing may cause interference between branching histories, decreasing prediction accuracy.

Some branches always resolve one way (i.e. that is they are always taken or always not-taken) within a particular task invocation. An example is a branch inside a loop which tests information that is loop-invariant (i.e., the information is not altered within the loop). Such a "consistent-branch" resolves consistently in all loop iterations. An illustrative example of a conditional branch whose resolution is constant, can be found in FIG. 2, with an if-then-else statement set forth on lines 4-8 of FIG. 2 inside of a loop set forth on lines 2-10 of FIG. 2. The branch that tests the loop-invariant variable c (line 4) resolves consistently.

Descriptions Of the Preferred Embodiments

Figure 2:
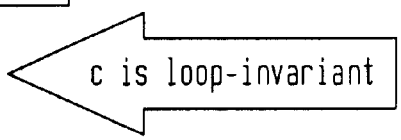
FIG. 2 shows a conditional branch whose resolution is consistent.

The conditional branch shown in FIG. 2 is also a member of a larger set of conditional branches, those whose outcome is determined by information that is available in advance of their prediction. According to the method of the invention, a special instruction—denoted a "set prediction on condition" (spoc) instruction—executes before the branch is predicted and operates to test that advance information. Upon such test of the advance information, this special instruction preconditions a branch prediction mechanism to make the correct prediction.

A. A First Embodiment

Figure 3:
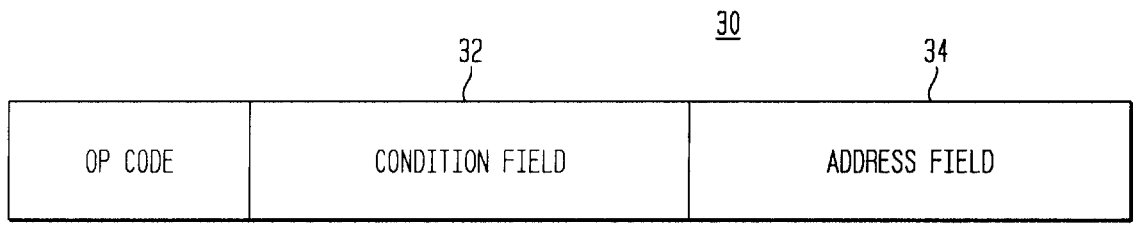
FIG. 3 shows a "set-prediction-on-condition" instruction.

Referring to FIG. 3, there is shown a spoc instruction 30 which specifies a condition 32 whose outcome matches that of a following conditional branch. This branch, the spoc-target, is located at a program counter (pc) relative address specified in the spoc's address field 34. The address is used to condition a branch prediction mechanism to predict the spoc-target correctly if it is encountered.

For example, a spoc instruction 30 with spoc-target $b_i$ shown in FIGS. 1a and 1b sets bht entry 0x0F to 11, if the spoc's condition 32 tests true (branch taken), and otherwise to 00. Branch $b_i$ is then predicted correctly by the bht when it is encountered. The conditions 32 and information tested by a spoc instruction 30 and its spoc-target may be different, but their outcomes match.

To ensure proper operation, execution of a spoc instruction 30 must complete before its spoc-target is predicted; it is also necessary that an address of an intervening branch does not alias the bht entry used. Otherwise the prediction could potentially change before it is accessed. It is noted that simple branch prediction mechanisms (likely to be found in embedded processors) facilitate alias analysis during code development.

Following this method, the conditions of all conditional branches are tested during execution of a potentially related spoc instruction because a processor cannot determine if a conditional branch is a spoc-target. This will not be the case for the subsequently described embodiments.

B. A Second Embodiment

The method of the first described embodiment may be difficult or impossible to use with more complex branch prediction mechanisms. For example, the path to a branch may be used to index prediction table entries in some sophisticated predictors. Since a branch may be approached along multiple paths, it is difficult to anticipate which table entry is used for a given prediction and to prevent possible aliasing between branches.

This problem may be solved by causing the execution of a conventional conditional branch (not shown) to be partitioned into condition-test and execute-branch phases that are performed by separate instructions. A conditional branch instruction includes a bit that identifies it as "preconditioned" or "not-preconditioned." Referring to FIG. 4, a preconditioned branch 40 is a spoc-target 42 and its outcome is known prior to execution. To record the predetermined outcomes of preconditioned branches 40, a processor is arranged to include a table 44 with 1-bit entries called a Branch Outcome Table (bot). An outcome entry is 1 if the branch is taken 46 and otherwise 0. A bot may be smaller than a bht because only one bit is used for every preconditioned branch 40 supported. A 16-bit bot 44 (2 bytes) records the predetermined outcomes of 16 preconditioned branches 40.

Figure 4:
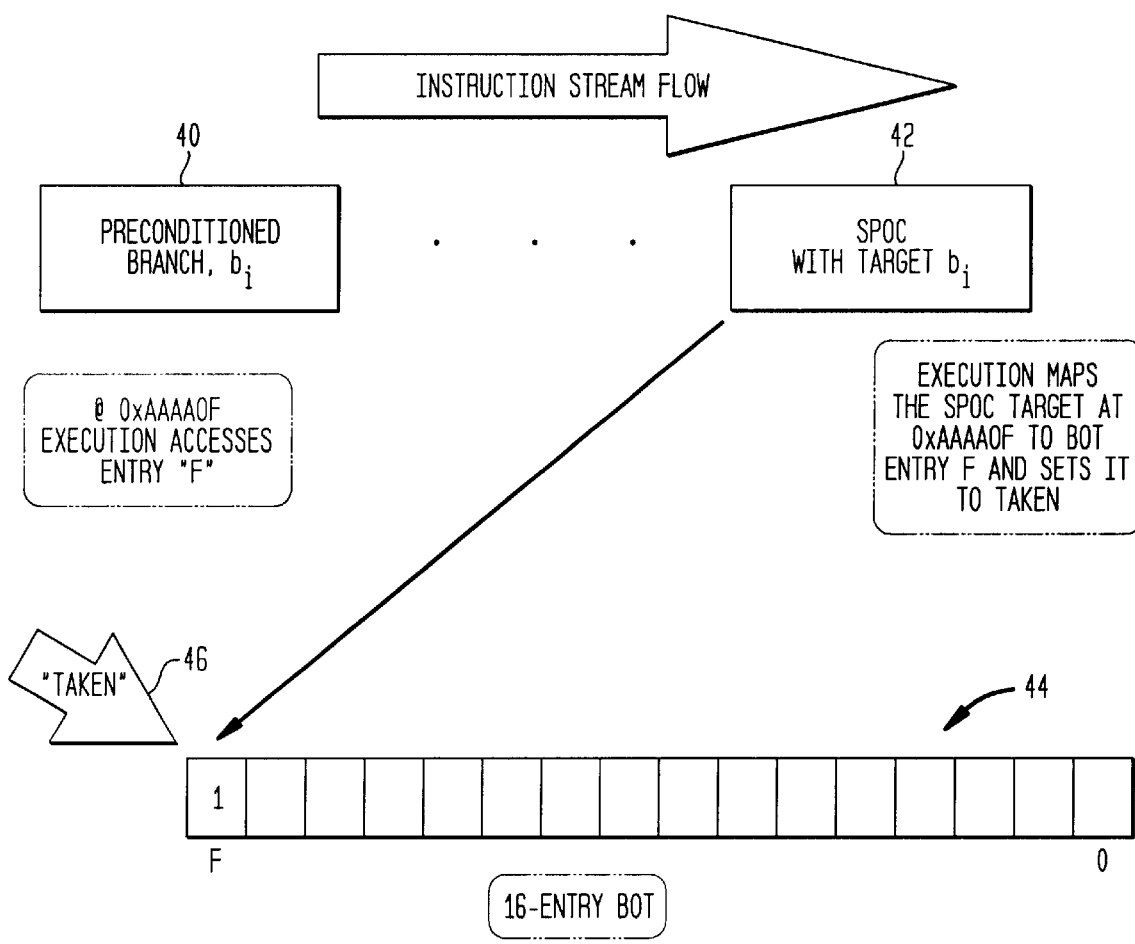
FIG. 4 shows a branch outcome table (bot) operation.

With this method, a spoc instruction sets the bot entry that is indexed by its address field (added to the pc) to taken or not-taken as appropriate. Referring to FIG. 4 there is shown a processor which uses the address of a preconditioned branch 40 to index the bot 44 to obtain its outcome, always predicting it correctly.

Since the outcome of a preconditioned branch 40 is known, the branch need not contain a condition. However, an architecture may include such conditions anyway to simplify processor design or to facilitate code testing and debugging. A preconditioned branch 40 whose condition tests differently than its bot entry indicates, may cause an exception. Conditional branches that are not preconditioned may be predicted with a branch prediction mechanism.

A preconditioned branch 40 is "active" from the time its bot entry is set by a spoc instruction to its last execution as that spoc-target. Code analysis must ensure that only one preconditioned branch 40 is active per bot entry at any time, unless their outcomes match.

The use of a bot simplifies alias analysis, because only the way addresses of active preconditioned branches map to bot entries is relevant. A table access method used within a branch prediction mechanism is irrelevant.

C. A Third Embodiment

Figure 5:
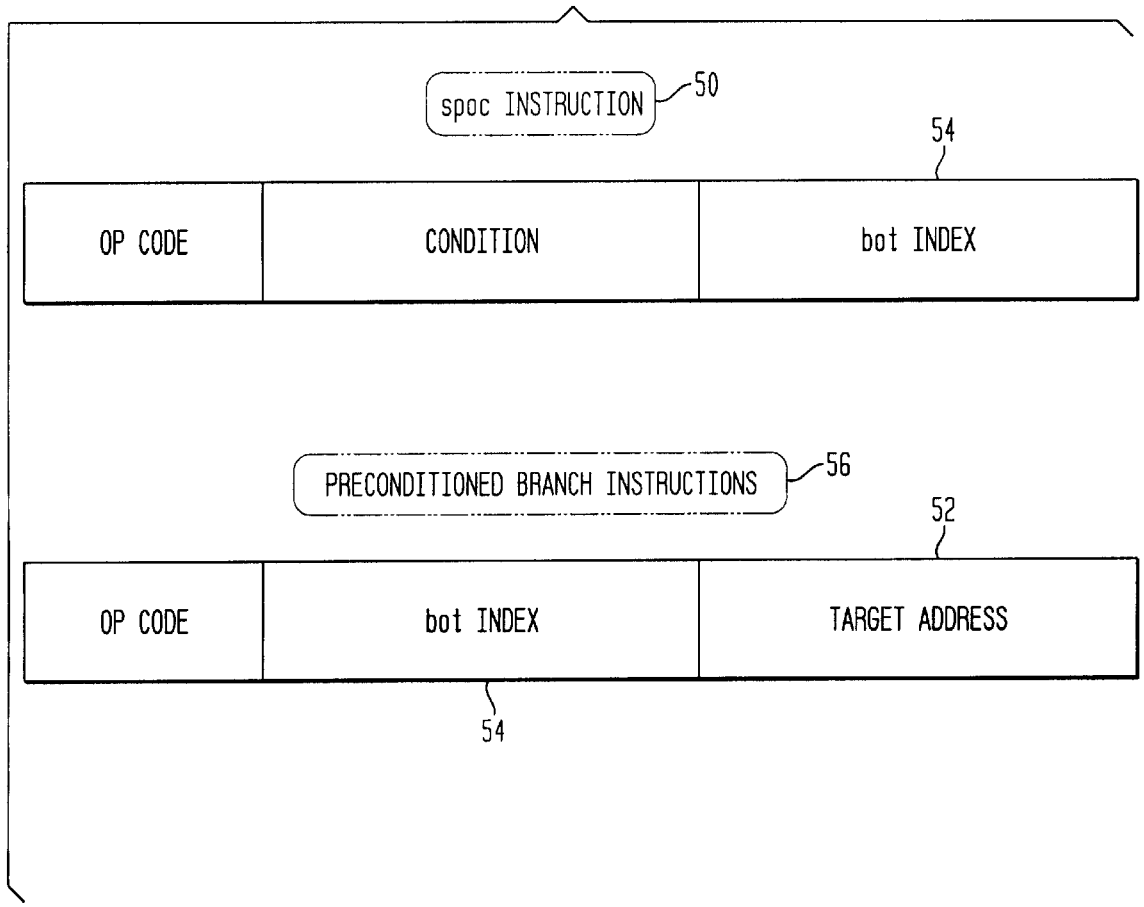
FIG. 5 shows an alternative spoc instruction and a pre-conditioned branch instruction; and, FIG. 6 is an exemplary system for implementing the method of the invention.

The method of this embodiment offers an improvement relative to the method of the proceeding embodiment by eliminating aliasing and by enabling a spoc instruction 50 to use any free bot entry to record an outcome. A bot entry is constrained in the method of the prior embodiment to that mapped to by the address of a spoc-target 52. If that entry is already in use, the method is not usable. With the method of this embodiment, spoc and preconditioned branch instructions have a bot-index field 54, as shown in FIG. 5, which specifies a bot entry, set by a spoc instruction 50 and accessed when a spoc-target is executed. Any free bot entry may be used, simplifying bot entry management and increasing opportunities for spoc instruction use.

A preconditioned branch instruction 56 encodes a bot-index 54, not a condition, because the outcome is already known. If an interrupt may be serviced while a preconditioned branch 56 is active, code analysis must ensure that an interrupting task does not overwrite its bot entry, or the entry must be saved before, and restored after, the interrupt.

It is noted that a disadvantage of this method is that the number of bot entries is a fixed part of an architecture, just as is the number of registers. The method of the preceeding embodiment, on the other hand, may be used with an architecture that executes on processors with bot's of any size.

The method of this embodiment may be implemented with a predicated jump instruction in an architecture with predicated instructions. If predicates (bits representing the outcomes of tests) are set and tested by separate instructions, they may be stored in a bot-like table. A spoc and a preconditioned branch instruction may be thought of as setting and testing a predicate respectively.

II. Applications of Methods of Invention

Given an architecture with spoc and preconditioned branch instructions, various processor design alternatives are available for implementation of the inventive methodology. For example, a processor may use a bot but not have branch prediction. In this case preconditioned branches execute as jumps and non-preconditioned branches are not predicted; therefore branch execution time is constant, facilitating best-case and worst-case analysis.

An alternative is a processor that has a bot and a branch prediction mechanism that may be enabled or disabled. Branch prediction may be disabled when a deterministic execution time is desired and be otherwise enabled. Using a bot technique with selected branches may improve performance in either case.

If an uncertain best-case execution time is acceptable, the prediction mechanism may be enabled. Worst-case analysis conservatively assumes that all non-preconditioned branches are miss-predicted, but not all may be. The worst-case time-bound is not improved by enabling the branch predictor, but energy may be saved by placing a processor in a sleep mode if a task completes early because some branches have been predicted correctly. Or, another task may begin execution.

While the invention is particularly well suited for use in microprocessors, it is also suited for use with compilers where spoc instructions may be used to generate enhanced code. Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 6:
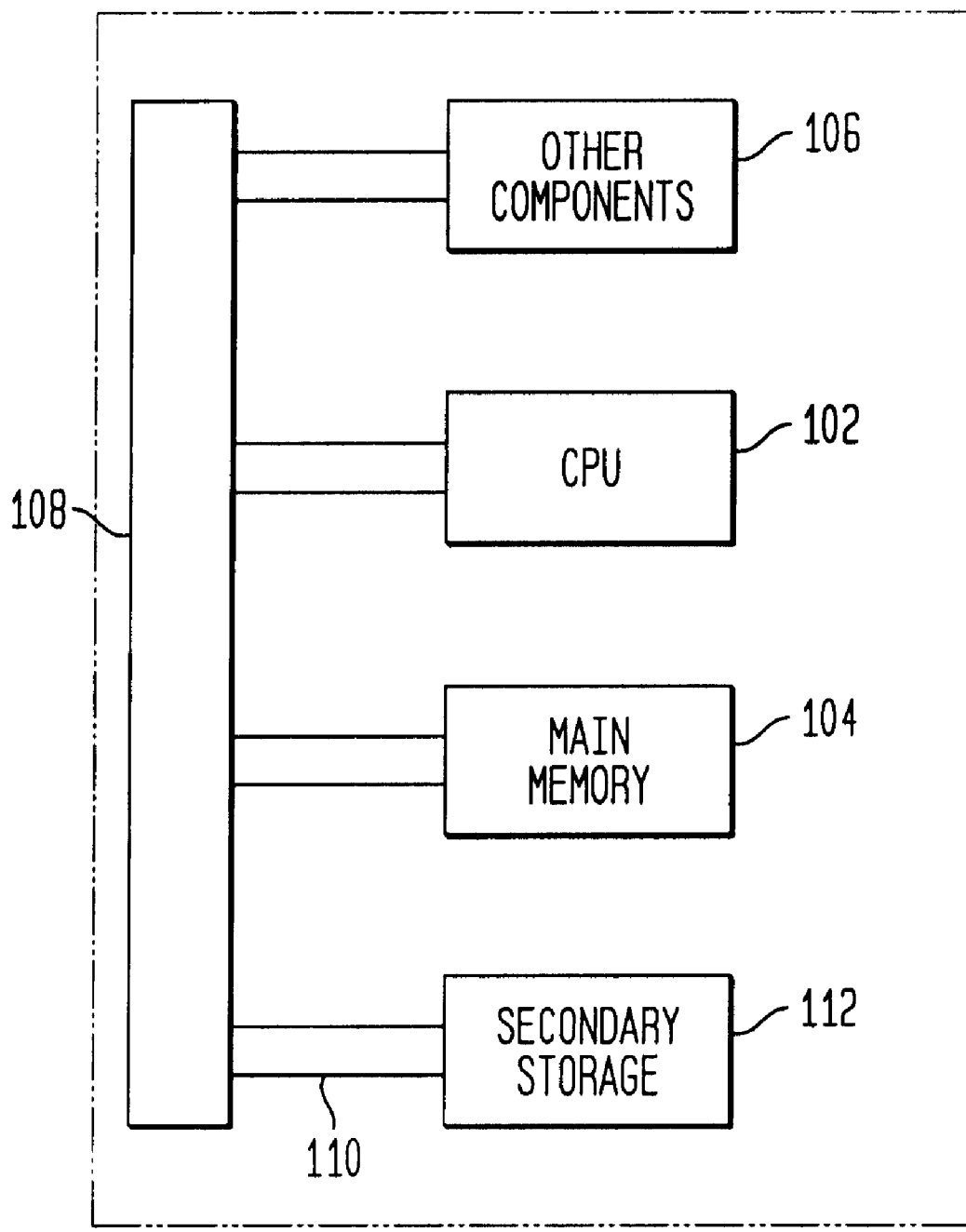

FIG. 6 illustrates an exemplary embodiment of a system 100 which can be used in conjunction with the methodology of the invention. System 100 is a computer that includes a central processing unit (CPU) 102, a main memory 104, a secondary storage unit 112 connected to a databus 108 by means of an input/output bus (I/O bus) 110, and other components 106 (including but not limited to math coprocessors, video display units, keyboards, mice, networking hardware) needed to operate computer 100. Databus 108, which connects the aforementioned components together, can be any physical conduit for data to be transferred from one component to the other and can consist of multiple databuses that are interlinked with each other.

CPU 102 is a general purpose computer capable of executing a stored program routine that implements the process description methodology described herein and shown in FIGS. 1a through 5. Main memory 104 might consist of a single memory chip or multiple banks of memory and includes Read Only Memory (ROM) and Random Access Memory (RAM). Secondary storage unit 112 is capable of storing and transmitting data and can consist of multiple secondary storage units that are linked together. Input data is stored in the secondary storage units 112 and is transmitted to CPU 102 through I/O bus 110 and data bus 108. I/O bus 110 can also consist of multiple physical conduits that are linked together. Secondary storage system 112 can consist of mass storage devices like magnetic disks, optical disk drives, or any other type of storage medium capable of storing large amounts of data and capable of providing random access to the data.

Secondary storage units 112 store the input data and the output results produced by the methodology of the invention. The process description extraction and translation generates code segments in a target process model language. The bht can be kept in main memory 104 and moved to secondary storage 112.

While the invention has been particularly shown and described with reference to preferred embodiments thereof, it will be understood by those skilled in the art that various changes in form and detail may be made without departing from the spirit and scope of the invention as defined in the appended claims. In particular, the present invention can be used in parallel processing with central processing units (CPUs) and compilers.

What is claimed is:

1. A method of conditional branch execution for real-time applications comprising the steps of:
   providing at least one conditional branch instruction;
   testing said at least one conditional branch instruction for an outcome prior to execution of said at least one conditional branch instruction;
   mapping said at least one conditional branch instruction to a testing step result selected from the group consisting of a first known outcome and a second known outcome; and
   executing said at least one conditional branch instruction based in part upon said testing step result; and
   setting an outcome entry based on said testing step result;
   wherein said setting step includes recording said outcome entry in a branch outcome table having a total size in bits corresponding to a total number of active pre-conditioned branch instructions.

2. The method of claim 1 wherein said executing step uses active pre-conditioned branch instruction addresses to address to the branch outcome table.

3. A method of conditional branch execution for real-time applications comprising the steps of:
   providing at least one conditional branch instruction;
   testing said at least one conditional branch instruction for an outcome prior to execution of said at least one conditional branch instruction;
   mapping said at least one conditional branch instruction to a testing step result selected from the group consisting of a first known outcome and a second known outcome; and
   executing said at least one conditional branch instruction based in part upon said testing step result; and
   setting a one-bit outcome entry based on said testing step result;
   wherein said setting step includes recording said outcome entry in a branch outcome table having a total size in bits corresponding to a total number of active pre conditioned branch instructions and said executing step uses active pre-conditioned branch instruction addresses to address to the branch outcome table.

4. The method of claim 3 wherein:
   said first known outcome is a jump taken and said second known outcome is a jump not-taken; and
   said executing step includes performing a jump according to said at least one condition branch instruction when said test step result is said first known outcome.

5. The method of claim 4 wherein said executing step includes skipping a jump within said at least one condition branch instruction when said test step result is said second known outcome.

6. A method of conditional branch execution for real-time applications in a processor comprising the steps of:
   providing a plurality conditional branch instructions having preconditioned and non-preconditioned instructions;
   testing at least one of said conditional branch instructions for an outcome prior to execution of conditional branch instructions;
   mapping said at least one of said conditional branch instructions to a testing step result and storing said testing step result in a one-bit outcome entry;
   recording said outcome entry in a branch outcome table having a total size in bits corresponding to a total number of active preconditioned branch instructions wherein said at least one of said conditional branch instructions is an active preconditioned branch; and
   executing said at least one of said conditional branch instructions based in part upon said testing step result using active pre-conditioned branch instruction addresses to address to the branch outcome table.

7. A method of conditional branch execution for real-time applications in a processor comprising the steps of:
   providing a plurality conditional branch instructions having preconditioned and non-preconditioned instructions;
   testing at least one of said conditional branch instructions for an outcome prior to execution of conditional branch instructions;
   mapping said at least one of said conditional branch instructions to a testing step result and storing said testing step result in a one-bit outcome entry;
   recording said outcome entry in a branch outcome table having a fixed number of outcome entry locations; and
   executing said at least one of said conditional branch instructions based in part upon said testing step result using an index of entry locations to address to the branch outcome table.

8. A processor adapted by software for conditional branch execution comprising:
   at least one conditional branch instruction;
   means for testing said at least one conditional branch instruction for an outcome prior to execution of said at least one conditional branch instruction;
   means for mapping said at least one conditional branch instruction to a testing means result selected from the group consisting of a jump-taken outcome and a jump-not-taken outcome;
   said mapping means including a one bit outcome entry for each testing means result;
   means for executing said at least one conditional branch instruction based in part upon said testing means result; and
   means for addresses said outcome entry using addresses selected from the group consisting of active conditional branch instruction addresses and a predetermined sequential number of outcome entries.

* * * * *

UNITED STATES PATENT AND TRADEMARK OFFICE
CERTIFICATE OF CORRECTION

PATENT NO.   : 6,430,682 B1
DATED        : August 6, 2002
INVENTOR(S)  : Harry Dwyer, III It is certified that error appears in the above-identified patent and that said Letters Patent is hereby corrected as shown below:

Column 8,
Line 62, please change "addresses" to read -- addressing --

Signed and Sealed this

First Day of October, 2002

Attest:

JAMES E. ROGAN
Attesting Officer
Director of the United States Patent and Trademark Office